United States Patent
Winkler et al.

(10) Patent No.: US 7,761,234 B2
(45) Date of Patent: Jul. 20, 2010

(54) METHOD AND DEVICE FOR DETERMINING THE LATERAL PATH OF A MOVING BODY, IN PARTICULAR OF AN AIRCRAFT

(75) Inventors: Falk Winkler, Cintegabelle (FR); Guillaume Fouet, Toulouse (FR); Didier Menras, Toulouse (FR)

(73) Assignee: Airbus France, Toulouse (FR)

( * ) Notice: Subject to any disclaimer, the term of this patent is extended or adjusted under 35 U.S.C. 154(b) by 737 days.

(21) Appl. No.: 11/686,214

(22) Filed: Mar. 14, 2007

(65) Prior Publication Data

US 2007/0219677 A1 Sep. 20, 2007

(30) Foreign Application Priority Data

Mar. 14, 2006 (FR) .................................... 06 02192

(51) Int. Cl.
  *G01C 23/00* (2006.01)
(52) U.S. Cl. .............................. 701/223; 701/3; 701/10
(58) Field of Classification Search .................. 701/3, 701/10, 223, 96, 300, 301, 26, 200, 209, 701/210, 201; 340/901, 903; 73/178 R
See application file for complete search history.

(56) References Cited

U.S. PATENT DOCUMENTS

| | | | | |
|---|---|---|---|---|
| 6,311,119 | B2* | 10/2001 | Sawamoto et al. | 701/96 |
| 6,313,758 | B1* | 11/2001 | Kobayashi | 340/932 |
| 2002/0165649 | A1 | 11/2002 | Wilhelm | |

OTHER PUBLICATIONS

Preliminary Search Report dated Nov. 14, 2006.
Ryan, et al. " A Mode-Switching Path Planner for UAV-Assisted Search and Resuce," Decision and Control, European Control Conference, 44th IEEE Conference on Seville, Spain, XP010884959, pp. 1471-1476, Dec. 12, 2005.
Malliot, "Digital Terrain Elevation Mapping System," Aerospace Applications Conference, 1996 IEEE Aspen, Colorado, vol. 4, XP010159095, pp. 91-105, Feb. 3, 1996.
Reeder, et al., "Two-Hydrophone Heading and Range Sensor Applied to Formation-Flying for AUVs," IEEE Techno-Ocean 2004, IEEE, XP010776084, pp. 517-523, Nov. 8, 2004.

\* cited by examiner

*Primary Examiner*—Richard M. Camby
(74) *Attorney, Agent, or Firm*—Dickinson Wright PLLC

(57) ABSTRACT

A method and device for determining the lateral path of a moving body determine, from a first lateral path and a lateral distance dependent on external visibility, a second lateral path corresponding to a lateral flight path that is followed by the moving body.

20 Claims, 3 Drawing Sheets

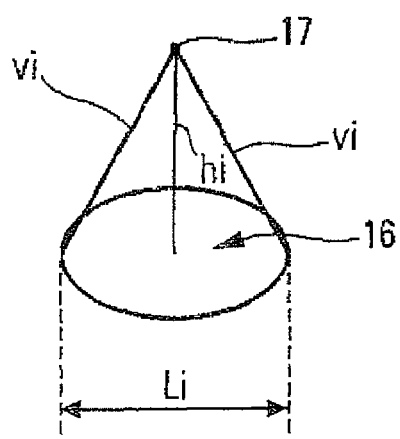
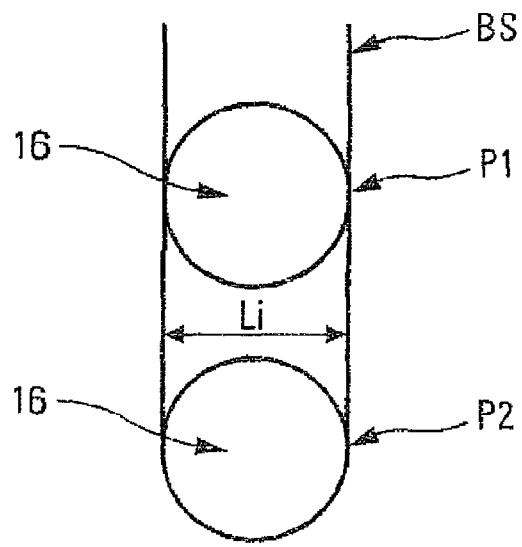
Fig. 3
Fig. 4
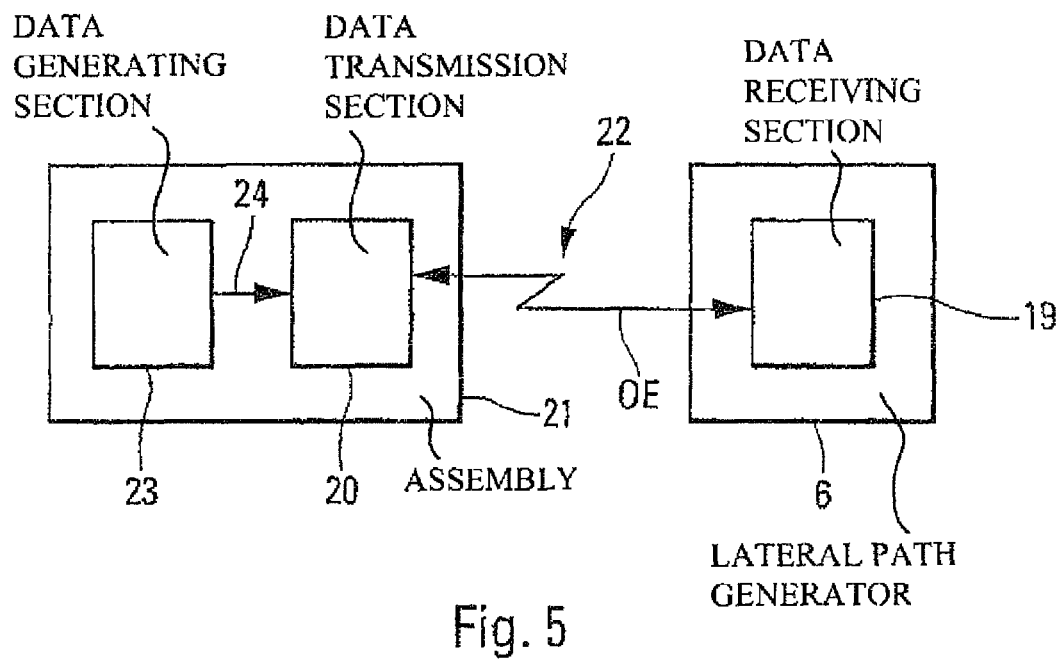
Fig. 5

METHOD AND DEVICE FOR DETERMINING THE LATERAL PATH OF A MOVING BODY, IN PARTICULAR OF AN AIRCRAFT

FIELD OF INVENTION

The present invention relates to a method and a device for determining at least the lateral path of a moving body.

BACKGROUND OF THE RELATED ART

The present invention can be applied to various types of moving body, and in particular to a ship. However, it is preferably applied to an aircraft flying over a terrain, in particular for the purpose of carrying out searches.

Even though not exclusively, the present invention applies more particularly to Search and Rescue (SAR) operations, that is to say to searches for and locations of persons (who can be in difficulty), installations and/or equipment on the ground. It is known that such searches can be carried out by several aircraft flying as a patrol, which use visual guidance and/or keep radio contact between themselves in order to try to optimize the search zone. An optimization consists in obtaining a maximum and complete search cover such that a single aircraft carries out the search at one point of the cover zone and that any point in the zone in question can be seen from one of said aircraft.

However, the searches carried out in the normal way are not optimized to the best of the capabilities of a patrol of aircraft, since it is frequent that two aircraft fly over (at least partially) the same zone.

SUMMARY OF THE INVENTION

The purpose of the present invention is to overcome these disadvantages. It relates to a method for determining at least the lateral path of a path of a moving body, in particular the lateral path of a flight path of an aircraft flying over a terrain, for example during searches for persons and/or objects that are on that terrain.

For this purpose, according to the invention, said method is noteworthy in that:
a) there is determined data comprising at least one item of data relating to the external visibility at the moving body;
b) a lateral distance is calculated using said data;
c) a first lateral path corresponding to the lateral path of a first path (described below) is generated; and
d) from said first lateral path and said lateral distance, a second lateral path corresponding to the lateral path of a second path which must be followed by said moving body is determined.

Preferably, said first path is the path followed by an auxiliary moving body which precedes said moving body for which said second path is determined.

Thus, the method according to the invention makes it possible to adjust in real time the lateral position of the moving body with respect to the lateral path of another path which preferably corresponds to the path followed by an auxiliary moving body. Consequently, if said moving body and said auxiliary moving body are aircraft which are part of a search patrol, it is thus possible to obtain an optimization of the search zone, as described in greater detail below. This optimization takes account of the external visibility at the aircraft, and it does so in the manner described below.

Advantageously, in a supplementary step, the moving body is guided in order to make it follow said second path. Preferably, this guidance is carried out automatically. Thus, the pilot of the moving body does not have to carry out the guidance of said moving body manually and can therefore, during a search of the described type, dedicate himself to the visual acquisition of the objective (the sought person or object). This can be particularly useful during searches carried out in poor visual conditions.

Moreover, in a particular embodiment, the following operations are also carried out:
there is determined an area of terrain which corresponds to a part of the terrain flown over, visible from the moving body, and which depends on said second path; and
this area of terrain is displayed to the pilot of the moving body on at least one display screen, in conjunction with a symbol illustrating the horizontal position of said moving body.

This area of terrain preferably corresponds to the area on the ground that can be seen from the moving body, said display making it possible to facilitate the perception of the visible area, that is to say of the effective search area during searches. In particular, this makes it possible, in the case of use of a beacon by the objective, to facilitate its visual acquisition, simultaneously knowing the visible area of terrain and the horizontal position of the moving body with respect to that visible area of terrain, and the position of the beacon (which can also be indicated on the display screen for this purpose).

In a first particular embodiment, in step b) the sum of an external horizontal visibility (such as defined in the usual manner in meteorology) at the position of the moving body and an external horizontal visibility (of the same type) at the position of said first path is produced in order to obtain said lateral distance.

Moreover, in order to refine the calculation of said lateral distance, it is also possible to take into account, in said step b), at least one particular feature of said first path and in particular, in the case of an aircraft, information on the inclination of the auxiliary aircraft which is following said first path. This makes it possible to remedy the fact that, when turning, the visibility is virtually zero, or even truly zero, to the outside of the turn.

In a preferred embodiment, said moving body is an aircraft and said first and second paths are flight paths. In this case, preferably, said second flight path is defined horizontally by said second lateral path and vertically, by a constant altitude.

Moreover, in this preferred embodiment, in a particular variant embodiment relating to flying over a flat terrain and/or to piloting at constant height, the lateral distance EL is calculated using the following expression:

$$EL = \sqrt{v1^2 - h1^2} + \sqrt{v2^2 - h2^2}$$

in which:
v1 is the external visibility (in all directions) at the position of the said first flight path;
h1 is the height of said first flight path;
v2 is the external visibility (in all directions) at the position of the aircraft; and
h2 is the height of the aircraft This lateral distance EL thus corresponds to the sum of two half-widths of strips, each of which corresponds to the area on the ground which is visible to the crew of the auxiliary aircraft which is following said first flight path and to the crew of the aircraft which is using the method according to the invention respectively. In the preceding expression, it is also possible to add a parameter to take account of a visibility restriction allowing looking out from one side of the aircraft only.

The present invention also relates to a device for determining at least the lateral path of a path of a moving body, and in particular the lateral path of a flight path of an aircraft flying over a terrain, in particular in order to carry out searches for objects and/or persons.

For this purpose, according to the invention, said device is noteworthy in that it comprises:

first means making it possible for an operator, in particular a pilot of an aircraft, to enter data comprising at least one item of data relating to the external visibility at the moving body;

second means for calculating a lateral distance using said input data;

third means for generating a first lateral path corresponding to the lateral path of a first path; and fourth means for determining, from said first lateral path and from said lateral distance, a second lateral path corresponding to the lateral path of a second path which must be followed by said moving body.

Moreover, said device advantageously and additionally comprises guidance means which are formed in such a way as to assist in guiding the moving body along said second path. These guidance means can of course comprise means, such as a flight director for example in the case of an aircraft, which are designed to give information to the pilot in order to allow him to have said second path followed manually. However, in a preferred embodiment, said guidance means comprise automatic piloting means which automatically, in the usual manner) carry out the guidance of the moving body along said second path. In this case, the pilot can dedicate himself to other tasks, such as the observation of his environment for example.

Furthermore, in a particular embodiment, the device according to the invention additionally comprises display means making it possible to display, on at least one display screen, in conjunction with a symbol illustrating the horizontal position of said moving body, an area of terrain which depends on said second flight path and which preferably represents an area visible from said moving body.

Furthermore:

in a first variant embodiment, said third means comprise input means allowing an operator to enter data making it possible to form said first path, such as the flight plan of the auxiliary aircraft which flies along said first flight path for example; and/or in a second variant embodiment, said third means comprise means of receiving data able to receive data (in particular from said auxiliary moving body) making it possible to form said first path.

BRIEF DESCRIPTION OF THE DRAWINGS

The figures of the appended drawing will give a good understanding of how the invention can be embodied. In these figures, identical references denote similar items.

FIG. 3 shows, diagrammatically, an area on the ground visible from an aircraft.

FIG. 4 illustrates the formation of a search strip from search areas.

FIG. 5 is a diagrammatic illustration of a particular embodiment of means forming part of a device according to the invention.

DETAILED DESCRIPTION OF THE INVENTION

Figure 1:
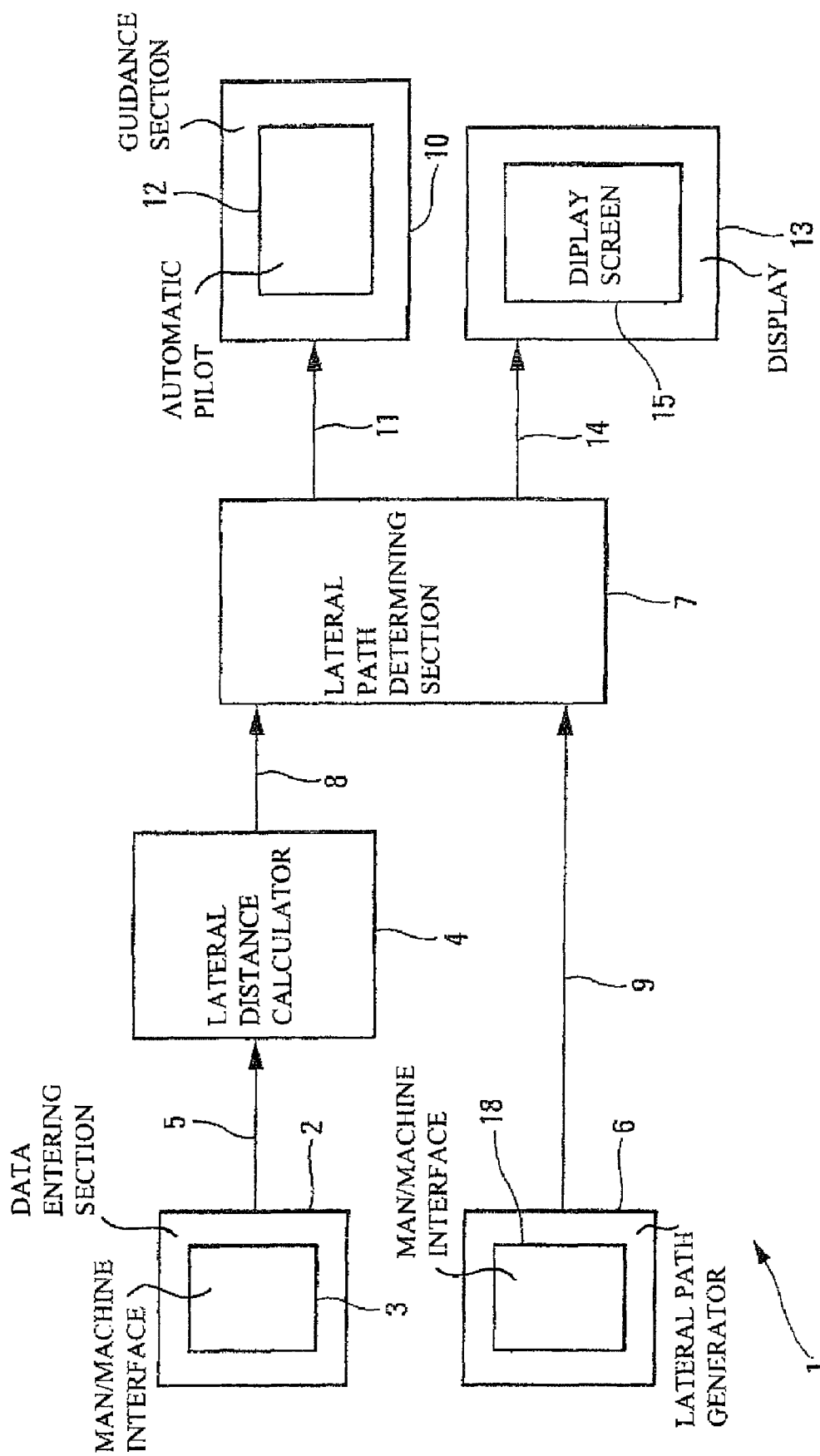
FIG. 1 is the block diagram of a device according to the invention.

The device 1 according to the invention and shown as a block diagram in FIG. 1 is intended to determine at least the lateral path of a path followed by a moving body. Even though said device 1 can be applied to various types of moving body, and in particular to ships, the following description refers exclusively (as a preferred application) to an aircraft A, in particular a military transport aircraft, flying over a terrain. This aircraft A can in particular be intended for carrying out searches for persons and/or for objects that are on the terrain flown over. Even though not exclusively, the present invention applies more particularly to SAR (Search And Rescue) operations, that is to say to searches for and locations of persons (who can be in difficulty) on the ground and/or installations and/or equipment.

According to the invention, said device 1 which is installed on the aircraft A and which is intended at least for determining the lateral path TL of the flight path TV of that aircraft A, comprises:

means 2 which comprise, for example, a man/machine interface means 3 and which are formed in such a way as to allow an operator, in particular the pilot of the aircraft A, to enter data into said device 1, and in particular at least one item of data relating to the external visibility at the aircraft A;

means 4 which are connected by the intermediary of a link 5 to said means 2 and which are formed in such a way as to calculate a lateral distance EL from data entered using said means 2;

means 6, described below, for generating a lateral path TL1 corresponding to the lateral path of a flight path TV1; and means 7 which are connected by the intermediary of links 8 and 9 respectively to said means 4 and 6 and which are formed in such a way as to determine, from said lateral distance EL received from said means 4 and from said lateral path TL1 received from said means 6, a lateral path TL corresponding to the lateral path of the flight path TV which must be followed by said aircraft A.

Figure 2:
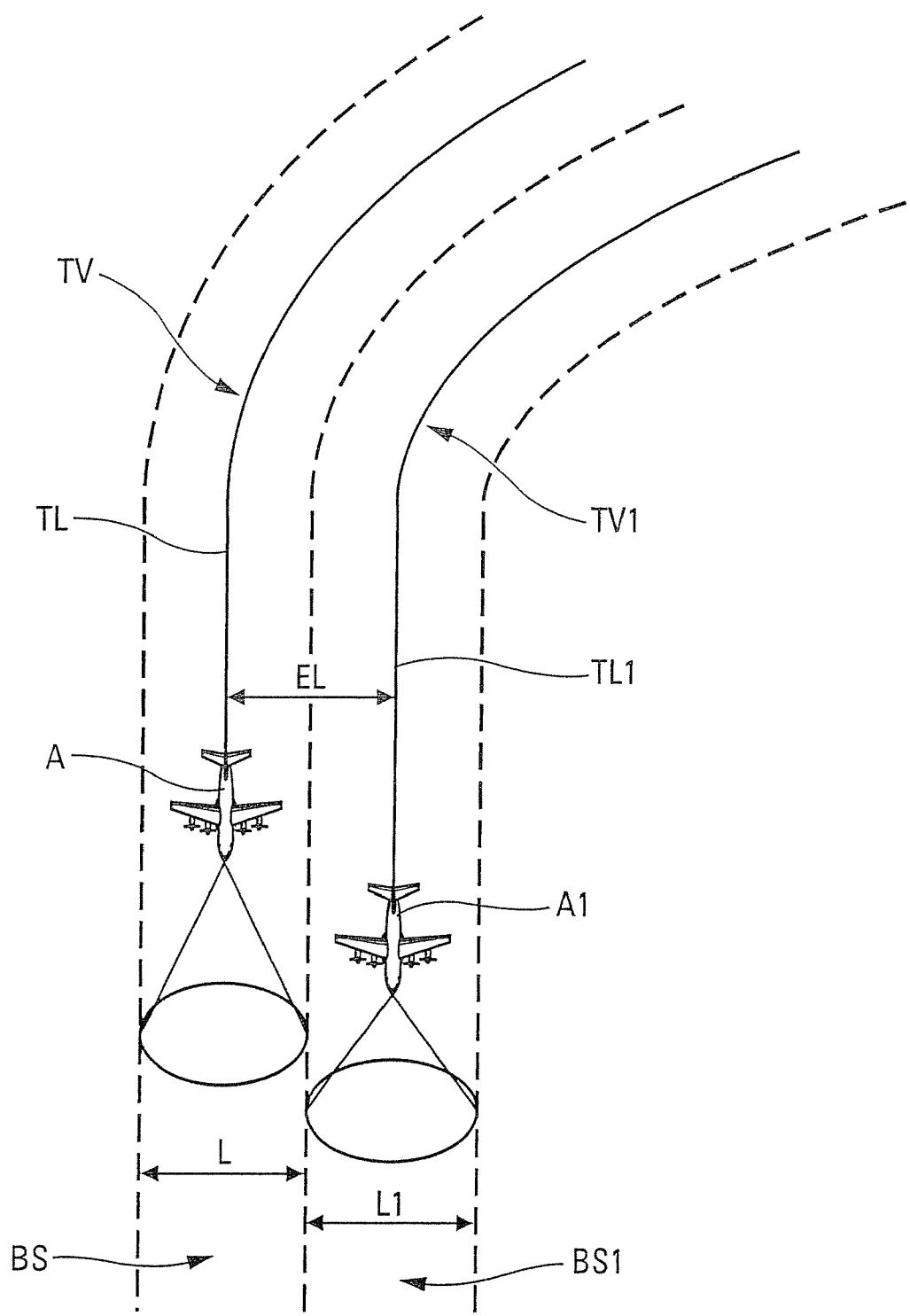
FIG. 2 is a diagrammatic illustration of an example of flight used in application of a device according to the invention.

In a preferred embodiment shown in FIG. 2, said flight path TV1 is the path followed by an auxiliary aircraft A1 which precedes the aircraft A equipped with the device 1 according to the invention.

Thus, the device 1 according to the invention makes it possible to adjust, in real time, the lateral position of the aircraft A with respect to the lateral path of a particular flight path which preferably corresponds to the path TV1 followed by an auxiliary aircraft A1. Consequently, if said aircraft A and said auxiliary aircraft A1 form part of a search patrol, it is possible to obtain an optimization of the search zone, as described in greater detail below. This optimization in particular takes account (by the intermediary of said lateral distance EL) of the external visibility at the aircraft A in the way described below.

Said means 7 are formed in such a way as to determine the whole of said flight path TV. In a preferred embodiment, this flight path TV is defined:

horizontally, by said lateral path TL; and vertically, by a constant altitude.

The device 1 according to the invention additionally comprises guidance means 10 which are connected by the intermediary of a link 11 to said means 7 and which are formed in such a way as to assist the guidance of the aircraft A following the flight path TV determined by said means 7. These guidance means 10 can comprise integrated means, such as a flight director for example, which are intended to give information to the pilot of the aircraft A in order to allow him to manually make that aircraft A follow the path TV received from said means 7.

However, in a preferred embodiment, said guidance means 10 comprise automatic piloting means 12 which automatically (in the usual manner) guide the aircraft A along the received flight path TV. In this case, the pilot of the aircraft A can dedicate himself entirely and in complete safety to tasks other than piloting. In particular, in the case of searches, the crew of the aircraft A do not therefore have to pilot said aircraft A manually and can thus dedicate themselves entirely and exclusively to the visual acquisition of the objective (the sought person or object). This can be particularly useful during searches carried out in poor visual conditions.

In a preferred embodiment, the lateral distance EL determined by the means 4 depends, in particular, on the width L of at least one area of terrain 16 on the ground and visible from the aircraft A. Such an area of terrain 16, which is shown in FIG. 3, makes it possible to create a visible strip of area BS on the ground during the movement of the aircraft A, as illustrated in FIG. 4, in which the area of terrain 16 has been shown in two positions P1 and P2 relating to two different (not immediately) successive times.

As described above and shown in the preferred example of FIG. 2, the device 1 according to the invention is intended to determine a flight path TV for the aircraft A, said flight path TV comprising a lateral path TL which is offset horizontally by a lateral distance EL from the lateral path TL1 followed by the auxiliary aircraft A1 which precedes it. Moreover, that lateral distance EL is formed such that the strip of area BS seen from the aircraft A and the strip of area BS1 seen from the auxiliary aircraft A1 are juxtaposed as accurately as possible. This makes it possible to obtain an optimal search cover. In order to do this, said means 4 determine a lateral distance EL preferably corresponding to the sum of two half-widths of the strips BS and BS1, that is to say:

$$EL = L/2 + L1/2.$$

Said means 4 must therefore determine the values of said half-widths, that is to say $L/2$ and $Li/2$.

In a simplified embodiment, said means 4 are formed in such a way as to consider that a half-width of band is equal to the external horizontal visibility, such as defined in the usual manner in meteorology, at the position of the aircraft in question. In this case, said means 4 are formed in order to produce the sum of an external horizontal visibility at the position of the aircraft A and an external horizontal visibility at the position of the auxiliary aircraft A1 for the purpose of obtaining said lateral distance.

Moreover, in a preferred embodiment relating to flying over a flat terrain and/or to piloting at constant height, said means 4 calculate the lateral distance EL using the following expression (1):

$$EL = \sqrt{v1^2 - h1^2} + \sqrt{v2^2 - h2^2}$$

in which:
- v1 is the external visibility (in space) at the position of said auxiliary aircraft A1 flying along said flight path TV1;
- h1 is the height of said flight path TV1 with respect to the ground;
- v2 is the external visibility (in space) at the position of the aircraft A; and
- h2 is the height of the aircraft A with respect to the ground.

This lateral distance EL therefore corresponds to the sum of the two half-widths of the strips BS and BS1, each of which corresponds to the area on the ground that is visible for the crew of the aircraft A and for the crew of the auxiliary aircraft A1 respectively. In this case, the visibility is defined by the maximum distance at which the crew of an aircraft can identify an objective situated on the ground. The half-width Li/2 of the area 16 as shown in FIG. 3 therefore satisfies the following equation:

$$Li/2 = \sqrt{vi^2 - hi^2}$$

which makes it possible to explain said expression (1).

In theory, the visible area of terrain 16 on the ground is a circle which is defined by the base of a cone, whose apex is the position 17 of the aircraft A, whose height is the height hi of said aircraft A and whose side is the visibility vi (FIG. 3). However, because of a visibility which is restricted by the airframe of the aircraft A, the area actually visible on the ground generally has the shape of an arc of circle.

In said preferred embodiment, if the aircraft A is at the same height as the auxiliary aircraft A1 (that is to say if h2 is equal to h1) and has the same visibility conditions (that is to say if v2 is equal to v1), the lateral distance EL becomes equal to twice the half-width, that is to say EL=L=L1.

The device 1 according to the invention thus makes it possible to adjust, in real time, the lateral distance EL to be followed in order to maintain optimum search conditions, taking account of possible variations in height.

It will be noted that, in a particular embodiment:
- a margin is provided in the determination of the visibility, because chance can include the appearance of shaded zones and therefore prevent the picking up of the objective if it is at the edge of a zone of visibility; and/or
- a modification of one of the parameters of the aircraft A generating a shaded zone because it is not taken into account by the auxiliary aircraft A1 is prevented; and/or
- the lateral distance EL is not assumed to be constant, because the speed can vary or the turns can have an effect on it.

In a particular embodiment, in order to refine said lateral distance EL, the means 4 can also take into account at least one particular feature of the flight path TV1 in the calculation of said lateral distance EL, in particular of data on the inclination of the auxiliary aircraft A1 which is following said flight path TV1. This makes it possible in particular to take into account the fact that an aircraft in a turn reduces its visibility on the outer side of the turn and increases it on the inner side.

Moreover, in a particular embodiment, said device 1 furthermore comprises display means 13 which are connected by the intermediary of a link 14 to said means 7 and which are formed in such a way as to display, on at least one display screen 15, in conjunction with a symbol illustrating the horizontal position of said aircraft A, an area of terrain which corresponds to a part of the terrain flown over, which depends on said flight path TV, and which represents the area on the ground visible from the aircraft A. Such a display makes it possible to facilitate the perception of the visible area, that is to say the effective search area during searches. Moreover, in the case of the use of a beacon by the objective, the device 1 can comprise means (not shown) for detecting and locating that beacon, and the display means 13 can furthermore display, on the display screen 15, a characteristic symbol which is positioned at the place where that beacon has been located. This makes it possible to facilitate its visual acquisition, simultaneously knowing the area of terrain visible from the aircraft A and the position of the beacon with respect to that area of terrain.

Moreover, in a particular embodiment (shown in FIG. 1) said means 6 comprise a man/machine interface means 18 which makes it possible for the crew of the aircraft A to enter data making it possible to determine the flight path TV1 of the auxiliary aircraft A1. Said interface means 18 can in particular be used for entering the flight plan of that auxiliary aircraft A1. This interface means 18 can be similar to the interface means 3 (or more simply can correspond to the latter).

Moreover, in another embodiment (shown in FIG. 5) said means 6 comprise means 19 of receiving data which receive data making it possible to form said flight path TV1. In order to do this, these data receiving means 19 cooperate with data transmission means 20 which are part of an assembly 21 which is installed in said auxiliary aircraft A1. Said data transmission means 20 and said data receiving means 19 form a data transmission system 22 transmitting data, preferably in the form of electromagnetic waves OE. The assembly 21 also comprises means 23 which know or which are capable of generating the data necessary for forming the flight path TV1 and which must be transmitted via the said data transmission means 20 to which they are connected by the intermediary of a link 24. Thus, the information used by the device 1 according to the invention can be updated in real time by means of the data transmission system 22.

The invention claimed is:

1. A method for determining at least the lateral path of a path of a moving body, the method comprising:
   generating a first lateral path corresponding to the lateral path of a first path, said first path being the path followed by an auxiliary moving body which precedes said moving body;
   determining, from said first lateral path and a lateral distance, a second lateral path corresponding to the lateral path of a second path which must be followed by said moving body;
   determining two half-widths of strips, each of which corresponds to the area on the ground which is visible by the crew of the moving body and by the crew of the auxiliary moving body respectively;
   summing said two half-widths so as to obtain said lateral distance which is used for determining said second lateral path;
   determining an area of terrain which depends on said second path; and
   displaying this area of terrain to the pilot of the moving body on at least one display screen, in conjunction with a symbol illustrating the horizontal position of said moving body.

2. The method as claimed in claim 1, further comprising guiding the moving body so as to make it follow said second path.

3. The method as claimed in claim 1, further comprising:
   detecting and locating a beacon; and
   displaying on said display screen a characteristic symbol which is positioned at the place where the beacon was located.

4. The method as claimed in claim 1, further comprising producing the sum of an external horizontal visibility at the position of the moving body and an external horizontal visibility at the position of said first path in order to obtain said lateral distance.

5. The method as claimed in claim 1, further comprising accounting for at least one particular feature of said first path so as to calculate said lateral distance.

6. The method as claimed in claim 1, wherein said moving body is an aircraft and said first and second paths are flight paths.

7. The method as claimed in claim 1, wherein said second path is defined horizontally by said second lateral path and vertically by a constant altitude.

8. An aircraft comprising a device that implements the method as claimed in claim 1.

9. A method for determining at least the lateral path of a path of a moving body, the method comprising:
   generating a first lateral path corresponding to the lateral path of a first path, this first path being the path followed by an auxiliary moving body which precedes said moving body;
   determining, from said first lateral path and a lateral distance, a second lateral path corresponding to the lateral path of a second path which must be followed by said moving body;
   determining two half-widths of strips, each of which corresponds to the area on the ground which is visible by the crew of the moving body and by the crew of the auxiliary moving body respectively; and
   summing said two half-widths so as to obtain said lateral distance which is used for determining said second lateral path, wherein:
   said moving body is an aircraft and said first and second paths are flight paths, and
   the lateral distance EL is calculated using the following expression:

$$EL = \sqrt{v1^2 - h1^2} + \sqrt{v2^2 - h2^2}$$

in which:
   v1 is the external visibility at the position of said first flight path;
   h1 is the height of said first flight path;
   v2 is the external visibility at the position of the aircraft; and
   h2 is the height of the aircraft.

10. The method as claimed in claim 9, further comprising guiding the moving body so as to make it follow said second path.

11. The method as claimed in claim 9, further comprising:
    detecting and locating a beacon; and
    displaying on a display screen a characteristic symbol which is positioned at the place where the beacon was located.

12. The method as claimed in claim 9, further comprising producing the sum of an external horizontal visibility at the position of the moving body and an external horizontal visibility at the position of said first path in order to obtain said lateral distance.

13. The method as claimed in claim 9, further comprising accounting for at least one particular feature of said first path so as to calculate said lateral distance.

14. The method as claimed in claim 9, wherein said second flight path is defined horizontally by said second lateral path and vertically by a constant altitude.

15. An aircraft comprising a device that implements the method as claimed in claim 9.

16. A device for determining at least the lateral path of a path of a moving body, said device comprising:
    third means for generating a first lateral path corresponding to the lateral path of a first path, this first path being the path followed by an auxiliary moving body, which precedes said moving body;
    fourth means for determining, from said first lateral path and from a lateral distance, a second lateral path corresponding to the lateral path of a second path which must be followed by said moving body;

first means for determining two half-widths of strips, each of which corresponds to the area on the ground which is visible for the crew of the moving body and for the crew of the auxiliary moving body respectively;

second means for producing the sum of said two half-widths in such a way as to obtain said lateral distance which is used by said fourth means for determining said second lateral path;

display means making it possible to display, on at least one display screen, an area of terrain which depends on said second path, in conjunction with a symbol illustrating the horizontal position of said moving body.

17. The device as claimed in claim 16, further comprising guidance means which are formed in such away as to assist in guiding the moving body along said second path.

18. The device as claimed in claim 16, wherein said third means comprise input means making it possible for an operator to enter data making it possible to form said first path.

19. The device as claimed in claim 16, wherein said third means comprise data receiving means able to receive data making it possible to form said first path.

20. An aircraft comprising the device claimed in claim 16.

* * * * *